Figure 5:
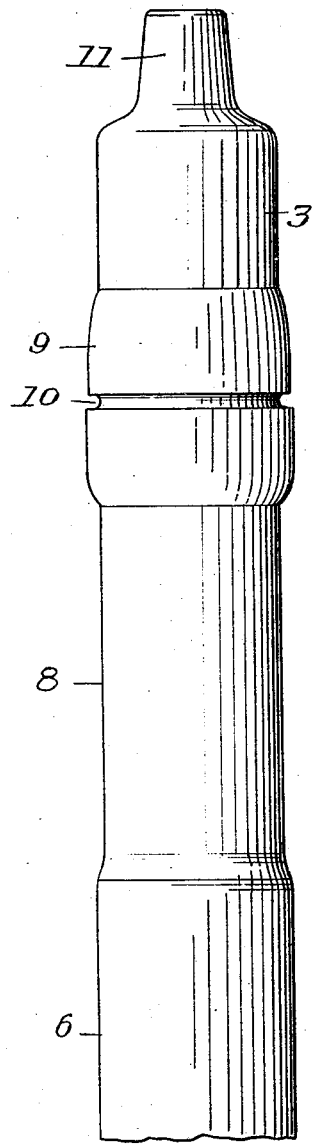

Sept. 8, 1931.  J. W. HEETER  1,822,400
WELL TOOL AND METHOD OF MAKING SAME
Filed Feb. 13, 1929  2 Sheets-Sheet 1
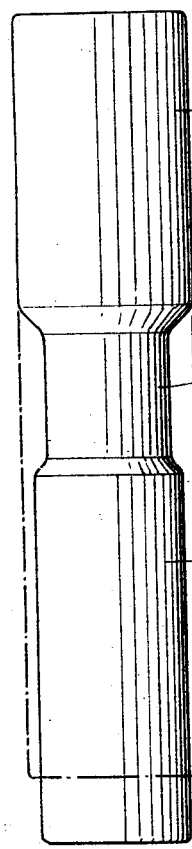
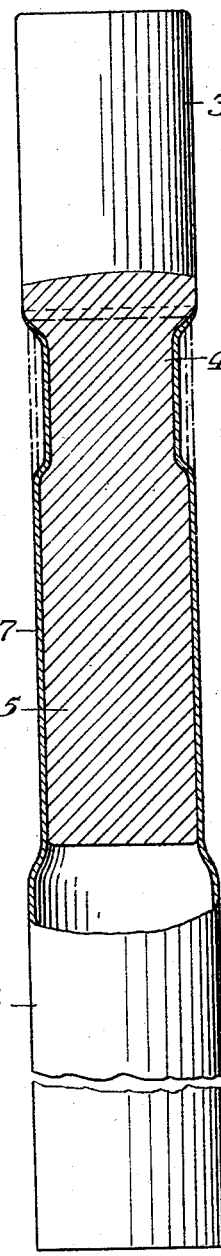
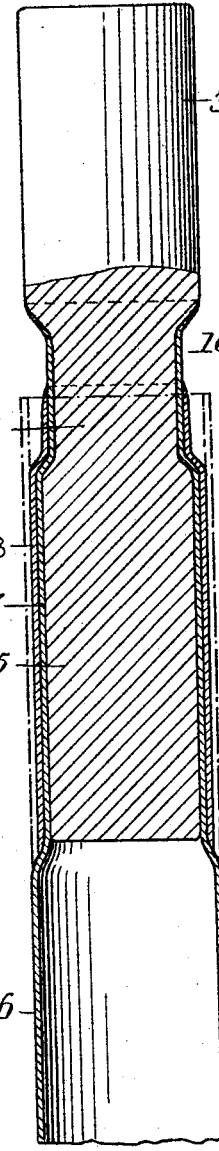
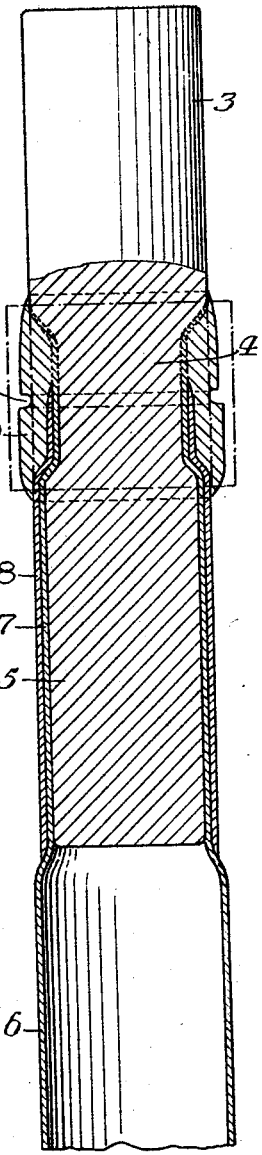
INVENTOR
Joseph W. Heeter
his attorneys Sept. 8, 1931.    J. W. HEETER    1,822,400
WELL TOOL AND METHOD OF MAKING SAME
Filed Feb. 13, 1929    2 Sheets-Sheet 2

INVENTOR
Joseph W. Heeter
by Byrnes, Stebbins & Parmelee
his attorneys

Patented Sept. 8, 1931

1,822,400

UNITED STATES PATENT OFFICE

JOSEPH W. HEETER, OF BUTLER, PENNSYLVANIA

WELL TOOL AND METHOD OF MAKING SAME

Application filed February 13, 1929. Serial No. 339,585.

This invention relates broadly to well tools and more particularly to well tools of the type embodying a solid head or stem joined to a hollow tube or socket. Such tools are commonly used for fishing purposes in oil wells and the like.

The invention has for its purpose to provide a well tool of the type above referred to having an exceptionally strong and durable joint between the head or stem and the hollow tube or socket whereby the likelihood of severance of the tool at the joint is minimized.

This application is in part a continuation of my co-pending application Serial No. 174,200, filed March 10, 1927, and the invention disclosed therein is in the nature of an improvement over United States Patent No. 959,341, issued May 24, 1910, to Charles M. Heeter. In that patent is disclosed a well tool having a head or stem with which is connected a socket or tubular member. The socket is swaged over the stem and a collar of metal is placed thereabout, the collar, socket and stem then being welded together throughout a portion only of the length of respective portions thereof which are swaged together.

The object of the said Heeter patent was to provide a strong joint by welding the extremity of the socket to the stem and reinforcing the weld by means of the collar. However, owing to the large mass of metal in the tool which has to be raised to a welding heat, it has been found that tools made in accordance with the disclosure of the said patent are weakened just below the welded portion. The intense heat acting on the socket, whose cross section is small, has the effect of reducing the tensile strength of the socket and also of reducing the strength of the stem within the socket. It has been found practically impossible or, at best, extremely difficult to form a tool in accordance with the disclosure of the said patent which maintains its strength at the portion just below the weld.

I have discovered that by protecting the sleeve and stem just below the welded portion of the tool, the deleterious effect of the welding heat necessarily imparted to it is minimized, whereby the strength of the tool is greatly increased. A tool may be provided in accordance with my invention which has the stem and socket intimately connected or welded together while the portions thereof below the weld are substantially unaffected by the welding heat.

I provide a well tool, comprising a stem, a socket thereabout, and a protective sleeve about a portion of the socket, the socket being intimately connected with the stem. I further provide a method of making a well tool, comprising interfitting a socket and stem, placing a protective covering over a portion thereof, and heating the socket and stem to a welding heat to weld them together, the protective covering preventing welding of the portions of the socket and stem protected thereby. The protective covering or sleeve is preferably slid over the end of the stem and socket so as to cover the portion of the tool which is subjected to heat at the time of the welding operation but which is not to be welded together, thereby preventing such portion of the tool from losing its natural strength. Further advantages of the invention will become apparent as the following description of a present preferred embodiment thereof proceeds.

In the accompanying drawings I have shown a present preferred embodiment of the invention wherein the respective Figures 1 to 7, inclusive, show a well tool during successive steps in its manufacture.

Referring more particularly to the drawings and to Figure 1 thereof, there is shown in chain lines in such figure the outline of a blank of metal which forms the nucleus of the stem of the tool. The blank is preferably of round cross section. It is first forged to provide a stem designated generally by reference numeral 2 and having a head 3 of substantially the cross section of the blank, a neck 4 of considerably reduced cross section and a shank 5 of cross section somewhat larger than that of the neck 4 but smaller than that of the head 3. The stem 2 is formed from the blank by first applying a forming tool thereto which substantially reduces the intermediate portion thereof to provide the neck 4. Then the lower extremity is forged to provide the shank 5.

A tube designated generally by reference numeral 6 is provided which has a reduced extremity or socket 7 of a size adapted to closely embrace the shank 5 of the stem 2. In the manufacture of the tool, the socket 7 is introduced over the shank 5 until the extremity of the socket contacts with the shoulder formed between the neck 4 and the head 3 of the stem. This position is shown in chain lines in Figure 2. The socket is then swaged inwardly about the neck 4 so as to closely embrace the stem at such reduced portion. During the swaging action the metal of the socket tends to flow to a certain extent, thus providing a substantially tapered extremity of the socket which lies along the shoulder above mentioned.

After the socket has been introduced over the stem and swaged thereon as above mentioned, a sleeve shown in Figure 3 in chain lines is introduced over the head 3 of the stem until its lower extremity substantially abuts the shoulder formed between the reduced socket 7 and the body of the tube 6. Preferably the lower extremity of the sleeve is first beveled to conform substantially to the shoulder on the tube. The upper extremity of the sleeve purposely terminates substantially centrally of the neck 4 of the stem, as shown in Figure 3. The sleeve is swaged inwardly throughout its entire length to closely embrace the stem and assumes the position indicated by reference numeral 8 in Figure 3. The ends of the sleeve are slightly tapered by the swaging action. The sleeve 8 serves as a protective member during the subsequent welding operation to be presently described, preventing the welding heat which is necessarily imparted to the tool from deteriorating the respective portions of the stem and socket below the portions thereof which are to be welded together.

After the sleeve 8 has been swaged inwardly to closely embrace the stem and socket, a collar or strengthening member shown in chain lines in Figure 4 is introduced over the head 3 of the stem to assume a position substantially about the neck 4. The collar is then swaged inwardly to closely embrace the stem and socket and the upper extremity of the sleeve. The collar as thus formed in position is indicated by reference numeral 9 in Figure 4.

During the swaging action a central depression 10 is formed in the collar to assist in initiating the subsequent welding operation, the portion of the collar above the depression 10 being adapted to be welded to the socket and stem and the portion thereof below the depression not being welded.

The upper extremity of the tool as shown in Figure 4 is then heated to a high heat and a pin 11 (Fig. 5) is roughly forged on the extremity of the head 3. The upper portion of the collar, the socket and the neck of the stem are then intimately connected by welding them together. The sleeve 8 protects the lower portion of the tool and prevents the heat necessarily applied to it for the welding operation from deteriorating or deleteriously affecting such lower portion. Thus a homogeneous welded joint is provided at the upper portion of the neck, while at the lower portion thereof and at the lower portions of the socket and stem, the respective members are not welded or affected by the welding heat but retain substantially their original strength.

Figure 6:
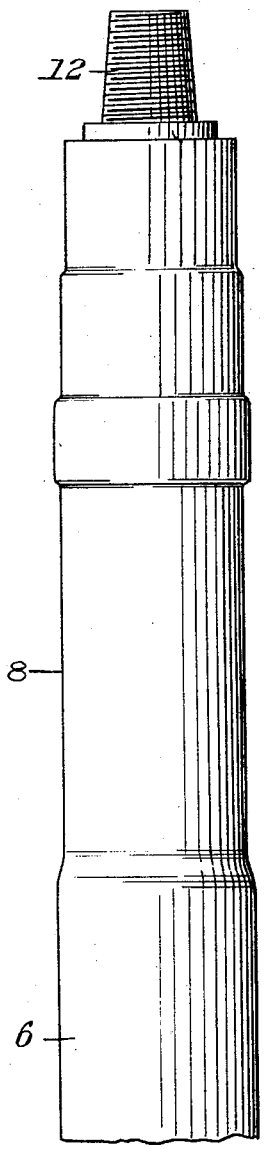
Figure 7:
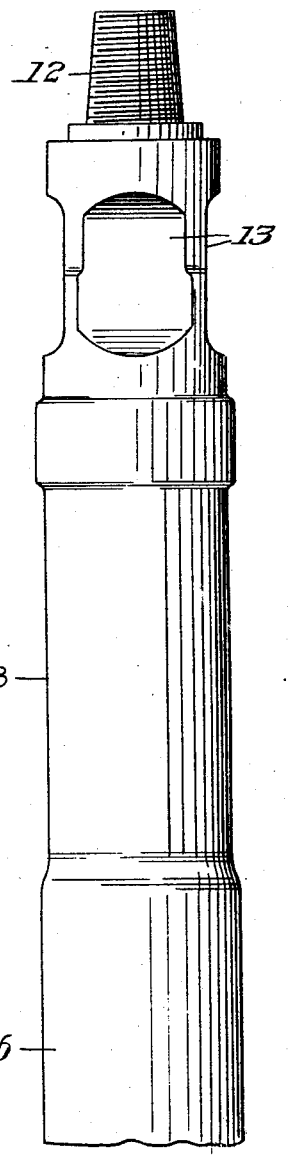

After the pin 11 has been forged on the extremity of the head and the parts have been welded as above explained, the pin is threaded as shown at 12 in Figure 6. The tool is suitably turned down to its desired finished shape and flattened portions 13 (Fig. 7) are provided for receiving a wrench. The completed tool is shown in Figure 7.

Although I have referred to the method as involving the welding together of portions of the tool, they may be otherwise intimately connected as by brazing. Certain of the steps in the method may be reversed and substantially the same results obtained. For instance, the socket 7 and the sleeve 8 may both be introduced over the stem before being swaged inwardly thereabout and the swaging may all be accomplished in a single step. The form of the tool may also be altered to suit the particular conditions of operation to be contended with and may be varied without departing from the spirit of the invention.

While I have shown and described a present preferred embodiment of the invention it is to be distinctly understood that the same is not limited thereto but may be otherwise variously embodied and practiced within the scope of the following claims.

I claim:

1. The method of uniting the stem and socket of a well tool, consisting in forming the stem with an annular recess, entering the stem in the socket portion and contracting the latter into the recess, swaging a sleeve on said socket and contracting the end thereof into a portion of said recess, encircling the recess with a collar, and welding together the collar, socket and stem.

2. The method of making a well tool which comprises reducing the section of the end portion of a stem, still further reducing the section of the inner end portion of the end portion of reduced section, swaging a socket into place over the entire end portion of reduced section of the stem, swaging a sleeve over said socket, said sleeve extending from about the mid-portion of the further reduced section of the stem to the outer end of the reduced section thereof, swaging a ring into place over said socket and said sleeve in the area of the further reduced section of the stem, and finally welding the ring, the socket and the sleeve together in the area of the further reduced section not occupied by the sleeve.

3. A well tool, comprising a stem having an end portion of reduced diameter having an annular recess, a socket having an end portion of reduced diameter closely fitting said stem end portion including the recess, a closely fitting sleeve covering the portion of reduced diameter of said socket with the exception of a part of the recess, and a collar encircling said recess, said collar, socket and stem being welded together.

4. A well tool comprising a stem having an end portion of reduced section, said end portion of reduced section having its inner end of still further reduced section, a socket closely fitting said stem around said end portion of reduced section, a closely fitting sleeve extending from about the mid-portion of the further reduced section of the stem to the extremity of the reduced section thereof, and a ring encircling the socket at the further reduced section of the stem, the stem, the socket and the ring being welded together around the further reduced section of the stem not covered by the sleeve.

In testimony whereof I have hereunto set my hand.

JOSEPH W. HEETER.